United States Patent Office 3,687,715
Patented Aug. 29, 1972

3,687,715
ARTICIFIAL LEATHER HAVING POLYURETHANE SURFACE FINISH LAYER
Koji Kigane, Shinichi Yamada, and Kazuo Koga, Mihara, Japan, assignors to Teijin Limited, Osaka, Japan
No Drawing. Filed Apr. 20, 1970, Ser. No. 30,279
Claims priority, application Japan, Apr. 24, 1969, 44/31,912
Int. Cl. B32b 27/12, 27/40; D06n 3/00
U.S. Cl. 117—76 R                                           8 Claims

ABSTRACT OF THE DISCLOSURE

An artificial leather composed of a fibrous substrate, a microporous polyurethane layer, and a polyurethane surface finish layer coated on said microporous polyurethane layer wherein a surface-unfinished article consisting of said substrate and said microporous polyurethane layer has specified ranges of thickness, apparent density and rate of water vapor permeability; said polyurethane surface finish layer has a specified range of thickness; and the polyurethane in said surface finish layer is a modified polyurethane comprising a polyol of a specified content of a polyoxyethylene segment and producing films having specified ranges of stress at 10% elongation and rate of water vapor permeability. The modified polyurethane of such composition and nature contributes to the excellent water vapor permeability, toughness, and physical or mechanical properties of the artificial leather.

---

This invention relates to an artificial leather comprising a fibrous substrate, a microporous polyurethane layer and a surface finish layer which has desirable surface properties such as toughness, durability and aesthetic characteristics and is much less detrimental to the water vapor permeability of a surface-unfinished article consisting of said fibrous substrate and said microporous polyurethane layer than the conventional surface finish layers.

More particularly, the invention relates to an artificial leather comprising a fibrous substrate, a microporous polyurethane layer formed by impregnating or coating a polyurethane elastomer and a polyurethane surface finish layer coated on said microporous polyurethane layer, wherein (A) a surface-unfinished article consisting of said substrate and said microporous polyurethane layer has a thickness of 0.3–2.5 mm., an apparent density of 0.3–0.9 g./cm.$^3$, and a rate of water vapor permeability of at least 3 mg./cm.$^2$ hr., usually 3–8 mg./cm.$^2$ hr., preferably 4.5–8 mg./cm.$^2$ hr. under 19 mm. Hg water vapor pressure difference, (B) said polyurethane surface finish layer has a thickness of 5–30$\mu$, preferably 5–20$\mu$; and (C) the polyurethane in said surface finish layer is prepared from a solvent solution or suspension of a polyurethane, said polyurethane being such that (a) it is derived from a polyol having a polyoxyethylene segment and a molecular weight of 600 to 4,000, preferably 1,000 to 3,000, a diisocyanate and a chain extender having a molecular weight of not more than 500, (b) it contains 15–75% by weight, preferably 30–65% by weight, of said polyoxyethylene segment, (c) a film prepared from said polyurethane has a stress at 10% elongation (as defined hereinbelow), at 20° C. and a relative humidity of 65%, of 0.1–2.0 kg./mm.$^2$, and (d) a 15$\mu$ thick non-porous film prepared from said polyurethane has a rate of water vapor permeability of at least 3 mg./cm.$^2$ hr., and usually 3–10 mg./cm.$^2$ hr. under 19 mm. Hg water vapor pressure difference.

It has been known to form a coating layer of various polymers such as nitrocellulose, acrylic resins, polyamide resins, or polyurethane resins on the surface of an artificial leather in an attempt to impart luster, compactness, smoothnss, toughness, resistance to abrasion, suppleness, resistance to bending, resistance to cold and good tactile hand. Such attempts to protect the artificial leather from wear, attack by water or other chemicals, and deterioration by heat and to improve the surface characteristics frequently resulted, although depending on the types of the surface coating resins, in a marked decline in water vapor permeability. Thus, no measure to improve the water vapor permeability of a surface-unfinished article can help to avoid a substantial deterioration of water vapor permeability of the finished article caused by the surface finish layer.

Heretofore, it has been practically impossible to provide an artificial leather having a surface finish layer with improved resistances, aesthetic characterics and water vapor permeability.

For instance, a method was proposed of forming fine open holes in a surface finish layer so as to reduce the deterioration of water vapor permeability ascribable to the presence of a surface finish layer, that is, the expedient employed in the formation of a microporous resin layer of a surface-unfinished article. According to this method, the resulting uniform and microporous coating becomes white and non-transparent. The method is therefore unsuitable for a surface finished layer which requires transparency, and results in a reduction of commercial value with respect to aesthetic characteristics. Furthermore, there is the disadvantage that such a porous coating is inferior in toughness to a non-porous coating and brings about a reduction in mechanical or physical resistance.

Some proposals have also been known to enhance the water vapor permeability of a coating by utilizing fillers. As one of such proposals, U.S. patent specification 2,976,182 discloses a method of forming a surface layer having good water proofness and water vapor permeability by coating an organic solvent dispersion or an aqueous dispersion of a hydrophilic polymer and a hydrophobic elastomer.

U.S. patent specification 2,575,577 states that a coating agent suitable for coating fabrics having water proofness and water vapor permeability is obtained by incorporating a great quantity of a hydrophilic diatomaceous earth in a rubber compounded article.

In these methods, a high water vapor permeability may be obtained by using very great quantities of fillers. But the use of such great amounts of fillers is very detrimental to the toughness of the coating, and it is difficult to apply these methods to the surface finishing of artificial leathers which require toughness.

The use of polymers having high water vapor permeability, such as cellulose acetate, cellulose nitrate, and polyvinyl alcohol, is also thought of as the surface finishing polymer, but these polymers have the defects of inferior toughness and durability when coated. On the other hand, the use of a polyurethane elastomer which is considered to be one of those most excellent in toughness and durability gives only unsatisfactory results in uses that require especially high water vapor permeability, for instance, in the surface finishing of leathers used as shoe uppers or clothing, because an ordinary polyurethane elastomer has a small water vapor permeability.

It has now been found that when a fibrous substrate having a microporous polyurethane layer is surface finished with a specific modified polyurethane resin in a thickness of 5–30μ, preferably 5–20μ, the synethetic leather possesses the above-mentioned resistance, aesthetic characteristics and water vapor permeability which are difficult to achieve together in conventional surface-finished artificial leathers.

Accordingly, an object of the present invention is to provide an artificial leather having the above-mentioned properties which are difficult to achieve together in the conventional surface-finished artificial leathers.

Another object of the present invention is to provide an artificial leather having excellent properties obtained by forming the above-described polyurethane surface finish layer on a surface-unfinished article consisting of a fibrous substrate and a microporous polyurethane layer formed by impregnating or coating a specific polyurethane elastomer.

Many other objects and advantages of the invention will become apparent from the following description.

The polyurethane which forms a surface finish layer of the artificial leather according to the invention will be described below in detail.

The polyurethane resins used to form the surface finish layer of the invention have in their main chains a substantially linear urethane linkage or such urethane linkage and a urea linkage, which may have a partially branched or cross-linked structure, and the term "polyurethane" used in the present invention is meant to include polyurethane-urea also. The polyurethane resins used in the invention should meet the following requirements.

(a) They are derived from polyols having polyoxyethylene segment and a molecular weight of 600 to 4,000, preferably about 1,000 to 3,000, diisocyanates and chain extenders having a molecular weight of not more than 500.

(b) They contain 15–75% by weight, preferably 30–65% by weight, of a polyoxyethylene segment.

These polyurethane resins possess the following properties.

(c) A film prepared from the polyurethane has a stress at 10% elongation, at 20° C. and a relative humidity of 65%, of 0.11–2.0 kg./mm.$^2$.

(d) A 115μ thick non-porous film prepared from the polyurethane has a rate of water vapor permeability of at least 3 mg./cm.$^2$ hr., usually 3–10 mg./cm.$^2$ hr., and preferably at least 3.5 mg./cm.$^2$ hr. under 19 mm. Hg water vapor pressure difference.

In addition to these properties, it is preferable that the polyurethanes have the following property.

(e) The intrinsic viscosity of the polyurethane at 30° C. in N,N-dimethyl formamide is at least 0.80.

The polyols having a polyoxyethylene segment are high-molecular-weight glycols, which have at both ends hydroxyl groups capable of reacting with an isocyanate group and predominantly containing high-molecular-weight glycols consisting mainly of polyoxyethylene segments. These polyols used in the present invention should consist mainly of a polyoxyethylene segment so that a surface finish polyurethane prepared by using it contains 15–75% by weight, preferably 30–65% by weight, of a polyoxyethylene segment. As the preferred polyols, we can cite polyoxyethylene glycol, polyoxyethylene propylene glycol, and polyoxyethylene butylene glycol. In the case of copolymerized polyols containing a polyoxyethylene segment and other oxyalkylene segment, it is preferred to choose copolymerized polyols having at least 60% by weight of a polyoxyethylene segment.

The requirement (b) given above is the only restriction on the content of the polyoxyethylene segment of the surface finish polyurethane, and the polyols having a polyoxyethylene segment can be used either alone or in combination or further in conjunction with a polyol having no polyoxyethylene segment.

Preferred examples of such polyols containing no polyoxyethylene segment and having a molecular weight of 600 to 4,000, preferably 1,000 to 3,000 are other polyoxyalkylene glycols such as polyoxypropylene glycol and polyoxybutylene glycol, and polyester glycols such as polyethylene adipate, polyethylenepropylene adipate, polybutylene adipate, polypropylene succinate and polybutylene sebacate and poly-ε-caprolactone.

These polyols free from a polyoxyethylene segment are usually employed in an amount of not more than 30% by weight, preferably not more than 20% by weight, in conjunction with a polyol having a polyoxyethylene segment.

The diisocyanates used to prepare the surface finishing polyurethane include, preferably, aromatic diisocyanates such as 4,4'-diphenylmethane diisocyanate, xylylene diisocyanate, 1,4-phenylene diisocyanate, 2,4-tolylene diisocyanate, 2,6-tolylene diisocyanate, and 1,5-naphthylene diisocyanate. Also, alicyclic diisocyanates such as cyclohexylene diisocyanate, 4,4'-dicyclohexylene diisocyanate, and 4,4'-methylene-bis(cyclohexyl isocyanate), and aliphatic diisocyanates such as tetramethylene diisocyanate and hexamethylene diisocyanate can be used.

The chain extenders used in the preparation of the surface finishing polyurethane are those known chain extenders having a molecular weight of not more than 500. Such chain extenders are bifunctional low-molecular-weight active hydrogen compounds which are capable of bonding the terminal isocyanate groups of a polyurethane to form a polyurethane polymer having a higher molecular weight. Preferred examples of such chain extenders are tetramethylene glycol, ethylene glycol, propylene glycol, p-xylylene glycol, N-methyl diethanolamine, and diethylene glycol. N-methylethanolamine, monoethanolamine, water, ethylene diamine, hexamethylene diamine, p-phenylene diamine, piperazine, and hydrazine can also be used.

The surface finishing polyurethanes used in the present invention are derived from polyols having a polyoxyethylene segment and a molecular weight of 600 to 4,000, diisocyanates and chain extenders having a molecular weight not more than 500. Methods of preparing such polyurethanes are known, and will not be described in detail in the present specification. For example, a one-shot process in the absence of solvent, a one-shot process in the presence of solvent, or a prepolymer process in the presence of solvent can be employed.

Variations in the water vapor permeability of a film composed of polyurethane according to variations in the constitutents of the polyurethane have not been previously known. We have studied these, and found the following facts.

(a) When the polyol content of the polyurethane or the molecular weight of the polyol becomes higher, the water vapor permeability of a film prepared from such polyurethane tend to increase.

(b) The water vapor permeability of a film prepared from the polyurethane varies depending upon the kinds of the polyol. When a polyoxyalkylene glycol is compared with a polyalkylene ester glycol having the same number of carbon atoms in the alkylene group, the former is better in water vapor permeability.

(c) Of the polyoxyalkylene glycols, those having the lesser number of carbon atoms in the alkylene group give better water vapor permeability. For instance, a film prepared from a polyurethane containing polyoxyethylene glycol having 2 carbon atoms as the polyol component has a desirable water vapor permeability, whereas a film prepared from a polyurethane containing polytetramethylene glycol having 4 carbon atoms as the polyol component has an unsatisfactory water vapor permeability.

(d) Accordingly, in the field of artificial leather which requires especially excellent water vapor permeability, it is essential to use a polyol consisting predominantly of polyoxyethylene segment as the surface finishing polymer.

(e) But when the content of polyol is increased, the hardness of the polyurethane decreases. Since polyurethanes which give water vapor permeability desirable for artificial leather have a very small hardness, the resulting artificial leather is poor in toughness, especially wear resistance.

Further extensive studies based on the foregoing findings led to the discovery that only a modified polyurethane having the composition specified in the present invention can give a film having both water vapor permeability and toughness. In other words, only by forming a surface finish layer having a thickness of 5–30μ, preferably 5–20μ using a polyurethane of such a composition, it is possible to obtain artificial leather having the above-mentioned difficultly compatible properties of toughness and water vapor permeability, and excellent physical or mechanical properties.

When the polyurethanes are produced by the one-shot process in the absence of a solvent, the resulting polymer mass is shaped into a suitable form such as chips or pellets, and if desired, is cured. The resulting polyurethanes are used as solvent solutions or suspensions. On the other hand, one method of producing polyurethanes according to the prepolymer process in the presence of a solvent involves charging a polyol into a reactor, dissolving it in a solvent, adding an excessive equivalent of a diisocyanate, carrying out the reaction to form a linear isocyanate-terminated prepolymer, reacting it further upon addition of a catalyst and a chain extender, and adding an end terminator at a point where the desired degree of polymerization is obtained, thereby completing the polymerization. During the reaction, a solvent is added to dilute the reaction mixture, which is stirred homogeneously. When a glycol is a used as the chain extender, the obtained polymer is polyurethane. If a part or whole of the glycol is replaced by water or a diamine, a polyurethaneura results. The type of the catalyst, its amounts, the time of its addition, the reaction temperature, its concentration, the time of dilution, stirring conditions, etc. are determined according to ordinary skill in the art or experimentally and are obvious to those skilled in the art.

The rate of water vapor permeability and the stress at 10% elongation of the surface finishing polyurethane used in the invention are measured as follows:

Rate of water vapor permeability

Using a sample which has been moistened for 24 hours in an atmosphere having a temperature of $23\pm1°$ C. and a relative humidity of $90\pm5\%$, a cup is made by the method according to JIS K–6549. Then, the cup is put in a constant-temperature constant-humidity machine maintained under the aforementioned conditions and the rate of water vapor permeability is measured mainly in accordance with the desiccant method specified in Method of Measurement of Moisture-Permeability of Leathers, JIS K–6549, except temperature and humidity conditions. The measured rate of water vapor permeability is expressed by an amount of water in milligram which passes through a 1 cm.$^2$ film per hour under 19 mm. Hg water vapor difference.

Stress at 10% elongation

A stress which occurs when the film is stretched 10% (to be referred to as stress at 10% elongation in the present invention) becomes a measure of toughness and durability. It is measured as a result of measurement of a load-elongation curve of the film, which will be described later in Example 1.

In the present invention, a finish layer having a thickness of 5–30μ, preferably 5–20μ is formed on a surface-unfinished artificial leather using a solvent solution or suspension of the surface finishing polyurethane as described hereinabove.

The organic solvents to be used to prepare such solvent solutions or suspensions include, for instance, good solvents having high boiling points such as N,N-dimethyl formamide, N,N-dimethyl acetamide, and dimethyl sulfoxide, poor solvents having high boiling points such as cyclohexanone, good solvents having medium boiling points such as dioxide, poor solvents having medium boiling points such as isopropyl acetone and n-butyl acetate, good solvents having low boiling points such as tetrahydrofurane, and poor solvents having low boiling points such as methylethyl ketone, methylene chloride. Minor amounts of diluents such as toluene and isopropanol which are non-solvents for the polyurethane polymers can also be used conjointly.

In particular, the use of the following mixed solvent (c) is preferred.

(a) At least one solvent selected from N,N-dimethyl formamide, N,N-dimethyl acetamide and dimethyl sulfoxide, or a mixture of these. It is especially preferable that such solvent be used in an amount of 20 to 150% by weight based on the surface finishing polyurethane.

(b) A mixed solvent consisting of 80–600% by weight of tetrahydrofuran, 80–600% by weight of dioxane and 0–150% by weight of methylethylketone, all percentages being based on the surface finishing polyurethane.

(c) Cyclohexanone preferable in an amount of 25–120% by weight based on the surface finishing polyurethane.

The surface finishing polyurethane is used as a solution or suspension in a solvent. If desired, two or more kinds of the polymer and the solvent may be used. In any case, a solvent solution or suspension of the surface finishing polyurethane is prepared by balancing the solubility and drying property of the resulting coating in consideration of the coating method chosen and desirable drying rate. In the preparation of this solvent solution or suspension, a necessary additive suitable for the end use of the resulting artificial leather and the coating method may be added in an optional stage. The examples of the additives that are often used include dyestuffs and pigments, especially processed pigments which have been rendered well dispersible in solvents, fillers, lustrants, delustrants, viscosity regulators, stickiness preventing agents, ultraviolet ray absorbent, anti-oxidants, and anti-static agents. In ordinary paints, plasticizers are sometimes added. But in the present invention, the addition of plasticizers is unnecessary, and rather undesirable because they are likely to deteriorate the physical properties of the resulting coating. In particular, hydrophobic plasticizers have to be refrained from using because they cause deterioration in water vapor permeability.

A surface-unfinished article consisting of a fibrous substrate and a microporous polyurethane layer formed by impregnation or coating of a polyurethane elastomer, which is used in the present invention, should have a thickness of 0.3–2.5 mm., an apparent density of 0.3–0.9 g./cm.$^3$, and a rate of water vapor permeability of at least 3 mg./cm.$^2$ hr. 19 mm. Hg.

The level of water vapor permeability of artificial leather varies depending upon the kind of the product and its ultimate uses, but usually it is reasonable to consider it as 2.8 mg. cm.$^2$ hr. under 19 mm. Hg water vapor pressure difference. According to the finishing method described above, it is possible to finish a surface-unfinished article without appreciably decreasing its water vapor permeability. In view of the above-mentioned level, it is preferably to use an unfinished article having a water vapor permeability of at least 33.0 mg.cm.$^2$ hr. under 19 mm. Hg water vapor pressure difference.

As the substrate, natural or synthetic woven or knitted fabrics, non-woven fabrics, and napped cloths are used, the non-woven fabrics being particularly preferred. As the polyurethane elastomer forming a microporous layer, any polyurethane elastomers known in the art can be used as long as they exhibit the above-mentioned properties when combined with the substrate material. Particularly recommendable are the elastomers proposed in the applicants' copending application No. 6,600, filed Jan. 28, 1970 in which one of the inventors of the present application is on the inventorship. The use of a surface-unfinished article prepared by the process proposed in such copending application using the elastomer disclosed there is recommendable. As described in detail in the specification of the copending application, such surface-unfinished article can be made by a process which comprises (a) preparing a solution or suspension in an organic solvent having a boiling point lower than 120° C., the solubility (at 25° C.) of water in the organic solvent being less than 50 g., preferably in the range of 1 to 25 g., per 100 g. of the solvent, whose resin content (calculated as solids is 8–30% by weight, the resinous component comprising more than 70% by weight of polyurethane elastomer consisting of (A) 100 to 10% by weight, preferably 100 to 15% by weight of a polyurethane elastomer composed of (i) a water-insoluble long chain diol selected from the group consisting of polyesters and polyethers having a molecular weight of 500 to 4000 and being substantially hydroxyl-terminated, (ii) an organic diisocyanate, (iii) a bifunctional active hydrogen compound having a molecular weight of 62 to 250, and (iv) a polyoxyethylene compound of a molecular weight of 500 to 4000 containing 1 to 2 active hydrogen atoms at the terminal radicals, such polyurethane elastomer containing, as hydrophilic segments, polyoxyethylene segments alone in an amount of 2 to 25% by weight and (B) 0 to 90% by weight, preferably 0 to 85% by weight, of a polyurethane elastomer composed of the compounds (i), (ii) and (iii), (b) mixing the resulting organic solvent solution or suspension with water of an amount ranging from 50 to 600% by weight, preferably 150 to 400% by weight, based on the resinous component and exceeding the solubility of water in the organic solvent, to prepare a dispersion;

(c) coating or impregnating a substrate with the resulting dispersion;

(d) selectively evaporating the organic solvent used from the so treated product at a temperature not higher than 80° C. and at least 10° C. lower than the boiling point of the lowest boiling constituent of the organic solvent used, thereby to gel the resinous component; and (e) drying the product.

The dried product obtained in step (e) above can be heat-treated at 130–160° C. for 5 to 20 minutes. As the bifunctional active hydrogen compound (iii) above, aliphatic glycols having 2 to 10 carbon atoms can be preferably used. In the above-mentioned process, it is preferably that the molar ratio of the bifunctional active hydrogen compound (iii) to the compound (i) or the compounds (i) and (iv) be in the range of from 1:1 to 4:1. The organic solvent used in the above-mentioned process is selected preferably from the group consisting of methyl ethyl ketone, methyl acetate, tetrahydrofuran/methyl isobutyl ketone mixtures (weight ratio of 75/25–60/40), tetrahydrofuran/toluene mixtures (weight ratio of 90/10–80/20) and tetrahydrofuran/ethyl acetate mixtures (weight ratio of 70/30–60/40). Preferably, also, the selective evaporation of the organic solvent is effected at a rate of less than 100 g./m.$^2$/min.

The surface finishing polyurethane layer may be coated on the surface of a surface-unfinished article by various coating procedures employed in the art, such as roll coating, doctor knife coating, air knife coating, air spraying, airless spraying, gravure printing, and curtain flow coating. The amount of the surface finish polyurethane to be coated is determined according to the end uses of the resulting artificial leathers. In the present invention, it is coated such that the coated solution has a thickness of 5 to 30μ, preferably 5–20μ after drying. Unless the thickness is at least 3μ, the toughness of the surface cannot be attained. If, on the other hand, the thickness exceeds 30μ, the desired water vapor permeability cannot be imparted to the product even if a surface finish layer having a high water vapor permeability of the present invention is formed on a surface-unfinished article having the above-mentioned properties.

On the other hand, when the thickness of the coating is less than 20μ, it is usually easy, according to the process of the invention, to impart the desired water vapor permeability to the final product. If the thickness is 20 to 30μ, the desired water vapor permeability can be obtained by controlling other conditions prudently.

Any conventional surface finishing method cannot lead to good finishing of a surface-unfinished article without sacrificing its water vapor permeability and other desirable properties. For example, the desired water vapor permeability can be obtained when the thickness of the coating is less than 5μ, but at the cost of the toughness of its surface.

As mentioned above, the artificial leather of the present invention possesses not only a sufficient toughness, but also a water vapor permeability of at least 2.8 mg./cm.$^2$. hr. under 19 mm. Hg water vapor pressure difference. By choosing the conditions, it can have a water vapor permeability of more than 4.0 mg./cm.$^2$ hr. under 19 mm. Hg water vapor pressure difference. Accordingly, shoes made by using such artificial leather as uppers or garments produced from this artificial leather do not at all give stuffy feeling during wearing.

The invention will now be described by the following examples, in which all parts are by weight unless otherwise specified.

EXAMPLE 1

The starting polyol had been dehydrated for 3 to 5 hours by heating at 100–110° C. and a pressure of 4–6 mm. Hg. All the solvents used in the reaction had been thoroughly dehydrated by passing them through a dehydrating column packed with molecular sieves. The chain extender used had been purified. The reactor had been purged with a dry nitrogen gas to prevent moisture absorption.

A reactor equipped with a stirrer was charged with 143 parts of polyoxyethylene glycol having a molecular weight of 1430 and 36 parts of tetramethylene glycol, which were dissolved by addition of a mixed solvent consisting of 154 parts of N,N-dimethyl formamide, 153 parts of dioxane and 153 parts of tetrahydrofuran. 128 parts of molten 4,4'-diphenylmethane diisocyanate were added with stirring. On addition of 0.31 part of triethylene diamine as a catalyst, these materials were reacted for 190 minutes at 40° C. A mixed solvent consisting of 128 parts of dioxane and 128 parts of tetrahydrofuran was added over a period of about 30 minutes to dilute the reaction mixture. After continuing the reaction for 50 minutes, a mixed solvent consisting of 255 parts of dioxane and 255 parts of tetrahydrofuran and containing 0.7 part of methanol was added, and the stirring was continued for 40 minutes, to complete the polymerization. The resulting polymer solution having a concentration of 20% was a transparent viscous liquid with slightly yellowish color and had a viscosity at 40° C. of 2,980 centipoises.

The polymer solution was diluted to 10% with N,N-dimethyl formamide, and coated on a smooth glass sheet using a doctor knife with the clearance between the doctor knife and the glass sheet being adjusted to 1.0 mm., 0.8 mm., 0.5 mm., 0.3 mm., and 0.1 mm., respectively. The glass sheet was dried for 16 hours by allowing it to stand horizontally in a dust-free box maintained at a temperature of 70° C. Colorless, transparent non-porous films which looked uniform to the naked eye were obtained, which had a thickness of 0.064 mm., 0.052 mm., 0.035 mm., 0.020 mm., and 0.007 mm., respectively. A part of the obtained films was finely cut, kept in a desiccator and subjected to the measurement of the intrinsic viscosity at 30° C. in N,N-dimethyl formamide in accordance with a customary method. The remainders of the films were put for a night and day in a room maintained at 20° C. and 60% RH, and thereafter, subjected to the measurements of the water vapor permeability, load-elongation curve, etc. The load-elongation curve was obtained by pulling five sheets of the film of the respective thickness at a rate of 50 mm./min. to a break point using an Instron-type tensile tester and dumbbell-type specimens with a width of 10 mm. and an inter-chuck distance of 50 mm., at 20° C. and a relative humidity of 60%, and computing an average value each of the recorded stress at 10% elongation, tenacity at break, and elongation at break. The water vapor permeability was measured at three points of each film in accordance with the method hereinbefore described. The measured water vapor permeability values were described on the vertical axis of a graph paper ruled at equal intervals both vertically and horizontally, and the dry thicknesses of the films, on the horizontal axis. As a result, the measured values were approximately on a hyperbola. From this curve, a water vapor permeability (to be referred to as standard water vapor permeability) corresponding to a film thickness of 0.015 mm. was read. An average value of the water vapor permeability of each film and the standard water vapor permeability are given in Table 1 below.

TABLE 1

| Film thickness (mm.): | Average value of the water vapor permeatility (mg./cm.$^2$ hr. 19 mm. Hg) |
|---|---|
| 0.064 | 2.0 |
| 0.052 | 2.3 |
| 0.035 | 3.4 |
| 0.020 | 4.9 |
| 0.007 | 7.5 |
| Standard water vapor permeability | 5.8 |

The polyoxyethylene segment content (to be referred to as the polyoxyethylene content) and the load-elongation measurement of the polymer are shown in Table 2.

TABLE 2

| Item of measurement | Unit (condition) | Value obtained |
|---|---|---|
| Polyoxyethylene content | Percent by weight/polymer | 46.6 |
| Intrinsic viscosity | N,N-dimethyl formamide at 30° C. | 0.82 |
| Stress at 10% elongation | Kg./mm.$^2$ | 0.30 |
| Tenacity at break | Kg./mm.$^2$ | 4.4 |
| Elongation at break | Percent | 490 |

While 468 parts of a 20% solution of the polymer were being stirred with a high speed mixer, 18.7 parts of "Microlith Black CK" (product of Ciba Limited, Switzerland) were added to form a uniform dispersion, followed by further addition of 1.2 parts of "Sumilizer BBM" (product of Sumitomo Chemical Co., Ltd., Japan), and 1.6 parts of "Cyasorb UV 24" (product of American Cyanamid Company). The solution was then diluted to a concentration of 9.5% with a mixed solution consisting of tetrahydrofuran, dioxane and cyclohexanone at a ratio of 2:4:1. The viscosity of the resulting solution (surface finishing agent) was 318 centipoises at 20° C.

Separately, a surface-unfinished artificial leather having a water vapor permeability of 4.8 mg./cm.$^2$ hr., a thickness of 1.52 mm. and an apparent density of 0.55 g./cm.$^3$ (obtained by impregnating a non-woven fabric of polyester staple fibers with a polyurethane solution, further coating it with a polyurethane solution, gelling the polyurethane, and drying to render the upper polyurethane layer uniformly microporous) was coated with the surface finishing agent obtained above by means of a gravure printing machine. The gravure roll used had a depth of about 40$\mu$, and the printing was carried out several times under the following conditions: a printing speed of 12 m./min., an air cylinder gauge pressure of 0.5 kg./cm.$^2$, a drying temperature of 120° C., and a drying time of 30 seconds. An artificial leather with the coating applied thereto in a thickness of 17$\mu$ and a take-up of 17.5 g./m.$^2$ was obtained. The artificial leather was embossed. The embossed artificial leather was found to have a water vapor permeability of 3.3 mg./cm.$^2$ hr.

The wear resistance of this artificial leather was measured by means of a rubbing fastness tester. The artificial leather was rubbed 60 times per minute under a load of 500 g. with a sheeting woven with a warp density of 141± 2/inch and a weft density of 135±2/inch. Injury to the surface of the artificial leather was slight even after rubbing 1,000 times. It was also confirmed that such artificial leather has good resistance to water and solvent.

When a sample artificial leather was subjected to the flexural test by means of a Satake-type repeated flexural tester, no cracking occurred even after flexing 1,200,000 times.

On the other hand, a surface-unfinished artificial leather was considerably injured after subjecting to the wear test 100 times, and the occurrence of cracks was observed after flexing 600,000 times.

Goodyear type men's shoes were made using the surface-finished artificial leather so obtained, and subjected to a wearing test. There was only a slight injury to the shoes even after wearing for 6 months, and no cracks occurred. No stuffiness was felt (stuffiness being Grade 2). There was no dampy feeling inside the shoes during wearing, and no deposition of water drops was observed.

The stuffiness during wearing was rated in the following manner.

Fifty adult men were chosen at random. Each man wore a pair of Goodyear type shoes of the same type made according to his size, for a week in the summer time. No preliminary knowledge of the water vapor permeability was given to the wearers, and all of them wore the same socks. The artificial leather was used only as uppers, and the same natural leather chosen so as not to hinder the purpose of experiments was used as other material such as soles. Each of the wearers commented on the wearing comfort at the end of the test period, and the results of the wearing test were rated in accordance with the following.

Grades:
1—3 out of 50 felt stuffiness
2—4–10 out of 50 felt stuffiness
3—11–25 out of 50 felt stuffiness
4—26–40 out of 50 felt stuffiness
5—at least 41 out of 50 felt stuffiness Comparative Example 1

The procedure of Example 1 was repeated except that polytetramethylene ether glycol having a molecular weight of 1500 was used instead of the polyethylene glycol. The properties of the polymer film obtained are given in Table 3. A surface finishing agent having a concentration of 9.5% and a viscosity at 20° C. of 302 centipoises was prepared using a 20% solution of the polymer in accordance with the procedure set forth in Example 1. A synthetic leather of the same type as described in Example 1 was coated with the resulting surface finishing agent, and the obtained synthetic leather having a coating with a thickness of 17$\mu$ and a polymer take-up of 17.7 g./m.$^2$ was subjected to the same tests as described in Example 1. The results are shown in Table 3. For the sake of comparison, the table also shows the results of Example 1.

TABLE 3

| | Example 1 | Comparative Example 1 |
|---|---|---|
| Polyoxyethylene chain content (percent by weight) of polyurethane | 46.6 | |
| Polyoxybutylene chain content (percent weight) of polyurethane | | 43.1 |
| Intrinsic viscosity (30° C. in N,N-dimethyl formamide) | 0.82 | 0.80 |
| Standard water vapor permeability (mg./cm.².hr) | 5.8 | 1.2 |
| Stress at 10% elongation (kg./mm.²) | 0.30 | 0.73 |
| Tenacity at break (kg./mm.²) | 4.4 | 4.6 |
| Elongation at break (percent) | 490 | 490 |
| Water vapor permeability after embossing treatment (mg./cm.² hr.) | 3.3 | 1.6 |
| Stuffiness during wearing | (¹) | (²) |

¹ Grade 2.
² Grade 4 (water drops are observed inside the shoes during wearing).

EXAMPLE 2

A reactor equipped with a stirrer was charged with 100 parts of polyoxyethylene glycol having a molecular weight of 3,000 and 7.5 parts of tetramethylene glycol, which were dissolved by addition of 72 parts each of N,N-dimethyl formamide, dioxane, and tetrahydrofuran. On addition of 34 parts of 4,4'-diphenylmethane diisocyanate and 0.14 part of triethylene diamine, the solution was reacted for 60 minutes at 40° C. Subsequently, 59.5 parts each of dioxane and tetrahydrofuran and 18 parts of p-phenylenediamine were added, the reaction was conducted for another 60 minutes. The solution obtained had a concentration of 30% and a viscosity at 40° C. of 36,000 centipoises. A mixed solvent consisting of 119.5 parts each of dioxane and tetrahydrofuran and 0.3 part of methanol was added, and the reaction mixture was stirred for 40 minutes to complete the polymerization. The resulting 20% solution of polymer was a yellow, transparent viscous liquid having a viscosity at 40° C. of 3,720 centipoises. The properties of the resulting polymer are shown in Table 4 below. A surface finishing agent was prepared in accordance with the procedure described in Example 1 using a 20% solution of this polymer, and coated on a surface-unfinished artificial leather of the same type as obtained in Example 1. The properties of the surface-finished leather are given in Table 4.

TABLE 4

Polyoxyethylene content (percent by weight) of polyurethane _____ 69.9
Intrinsic viscosity (38° C. in N,N-dimethyl formamide) _____ 0.91
Standard water vapor permeability (mg./cm.² hr.)__ 7.8
Stress at 10% elongation (kg./mm.²) _____ 0.14
Tenacity at break (kg./mm.²) _____ 4.6
Elongation at break (percent) _____ 510
Water vapor permeability after embossing treatment (mg./cm.² hr.) _____ 4.2
Stuffiness during wearing _____ Grade 1

EXAMPLE 3

A reactor equipped with a stirrer was charged with 105 parts of polyoxyethylene glycol having a molecular weight of 1500, 45 parts of polybutylene adipate having a molecular weight of 1,500, and 42 parts of diethylene glycol, which were dissolved by addition of 160 parts each of N,N-dimethyl formamide, dioxane and tetrahydrofuran. On addition of 128 parts of 4,4'-diphenylmethane diisocyanate, the solution was stirred for 5 minutes at room temperature, followed by addition of 0.32 part of triethylene diamine. The solution was heated to 40° C., and reacted for 180 minutes. It was then diluted with 133.5 parts each of dioxane and tetrahydrofuran, and reacted for 50 minutes to form a polymer solution having a concentration of 30% and a viscosity at 40° C. of 31,900 centipoises. A mixed solvent consisting of 266.5 parts each of dioxane and tetrahydrofuran and 0.7 part of methanol was added to the polymer solution, and stirred for 40 minutes to terminate the reaction. A surface finishing polyurethane polymer was obtained.

Thirty parts of "Microlith Scarlet RK" (product of Ciba Limited, Switzerland) was dispersed in 425 parts of a 20% solution of said polymer while stirring by a high speed mixer. Subsequently, a dispersion containing 2.7 parts of a silica-type delustrant dispersed in advance by means of a pebble mill, 1.5 parts of a stabilizer "Sumilizer BBM" (product of Sumitomo Chemical Co., Ltd., Japan), and 2.0 parts of "Cyasorb UV 24" (product of American Cyanamide Company, U.S.A.) were added, and the entire system was stirred thereby forming a surface finishing agent.

The surface finishing agent obtained was coated by means of a reverse roll coater on the surface of an artificial leather having a thickness of 0.6 mm., an apparent density of 0.58 g./cm.³, and a water vapor permeability of 5.6 mg./cm.² hr. obtained by coating one surface of a nylon woven fabric with a polyurethane solution and rendering the polyurethane layer porous. An artificial leather having a vivid red coating with a polymer take-up of 16 g./m.² and a thickness of 12μ was obtained.

The properties of the surface finishing polyurethane and those of the artificial leather obtained are shown in Table 5 below. As Comparative Example 2, the properties of a surface finishing polymer obtained in the same manner as above except that polybutylene adipate having the same molecular weight was used instead of the polyoxyethylene glycol, and those of a surface-finished artificial leather obtained by using this surface finishing polymer in the same manner as mentioned above are shown in Table 5.

TABLE 5

| | Example 3 | Comparative Example 2 |
|---|---|---|
| Polybutylene adipate chain content of polyurethane (percent by weight) | | 46.8 |
| Polyoxyethylene content of polyurethane (percent by weight) | 32.8 | |
| Intrinsic viscosity (30° C. in N,N-dimethyl formamide) | 0.81 | 0.84 |
| Standard water vapor permeability (mg./cm.².hr.) | 4.5 | 1.4 |
| Stress at 10% elongation (kg./mm.²) | 0.31 | 0.35 |
| Tenacity at break (kg./mm.²) | 4.4 | 4.7 |
| Elongation at break (percent) | 467 | 490 |
| Water vapor permeability of artificial leather after embossing treatment (mg./cm.².hr.) | 3.9 | 0.9 |
| Stuffiness during wearing | (¹) | (²) |

¹ Grade 1.
² Grade 5.

EXAMPLE 4

A reactor was charged with 90 parts of polyoxyethylene glycol having a molecular weight of 1806 and 22.5 parts of tetramethylene glycol, which were dissolved using a mixed solvent consisting of 215 parts of N,N-dimethyl formamide, 144 parts of dioxane and 144 parts of methyl ethyl ketone. On addition of 89.3 parts of 4,4'-diphenyl methane diisocyanate and 0.18 part of triethylene diamine, the solution was reacted for 120 minutes at 40° C., and further reacted for 40 minutes with addition of 3.7 parts of 1,2-propylene diamine. A 30% polymer solution having a viscosity at 40° C. of 45,000 centipoises was obtained. To the obtained polymer solution were added 0.4 part of monoethanol amine, 25 parts of dioxane and 25 parts of methyl ethyl ketone, and the reaction was carried out for 20 minutes to complete the polymerization, whereby a surface finishing polymer was obtained.

320 parts of the polymer solution so obtained were charged into a sealed stirring vessel, and uniformly dispersed by adding 5 parts of a delusterant, 80 parts of "Helio Fast Green GV Paste" (product of Bayer, Germany), 10 parts of "Helio Fast Yellow 10 GV Paste," 1.5 parts of Sumilizer BBM, and 2.0 parts of "Cyasorb UV-24" to form a surface finishing agent. The surface finishing agent so prepared was coated on the surface of a surface-unfinished artificial leather having a thickness of 0.8 mm., an apparent density of 0.45, and a water vapor permeability of 5.4 mg./cm.$^2$ hr. and having a microporous polyurethane layer coated on a napped woven fabric so that the take-up of the surface finishing agent was 12 g./m.$^2$ and the thickness of the coating was 9$\mu$, and the surface-finish artificial leather was embossed. The artificial leather so obtained had good tactile hand, suppleness and good resistance to wear, and suitable as clothing.

The properties of the surface finishing polymer and those of the surface-finished artificial leather are shown in Table 6 below.

TABLE 6

| | |
|---|---|
| Polyoxyethylene content of the polymer (percent by weight) | 43.8 |
| Intrinsic viscosity (in N,N-dimethyl formamide at 30° C.) | 0.88 |
| Standard water vapor permeability (mg./cm.$^2$ hr.) | 6.2 |
| Stress at 10% elongation (kg./mm.$^2$) | 0.71 |
| Tenacity at break (kg./mm.$^2$) | 5.2 |
| Elongation at break (percent) | 387 |
| Water vapor permeability after embossing treatment (mg./cm.$^2$ hr.) | 4.2 |
| Stiffness during wearing | Grade 1 |

EXAMPLE 5

120 parts of polyoxyethylene glycol having a molecular weight of 2000 was melted, and charged into an enamelled vessel. This was dissolved by adding 43 parts of tetramethylene glycol and 0.02 part of triethylene diamine, and maintained at 60° C. With stirring, 104 parts of p-xylylene diisocyanate at 45° C. were poured thereinto, and the entire system was more vigorously stirred. When the viscosity rose abruptly, the product was cast into a vessel coated with a silicone mold releasing agent. After solidification, the reaction product was cut into minute pieces, and heat-treated for 3 hours at 100° C. 250 parts of the polymer in chip form were dissolved in a mixed solution consisting of 300 parts of N,N-dimethyl formamide, 350 parts of dioxane and 350 parts of tetrahydrofuran.

A coating agent was prepared from the resulting polymer solution in accordance with the procedure set forth in Example 1. The coating agent was applied to a surface-unfinished artificial leather having a water vapor permeability of 6.4 mg./cm.$^2$.hr., a thickness of 1.53 mm. and an apparent density of 0.54 g./cm.$^3$, in a thickness of 24$\mu$. The properties of the surface finishing polymer and those of the surface-finished artificial leather are shown in Table 7 below.

TABLE 7

| | |
|---|---|
| Polyoxyethylene content of the polymer (percent by weight) | 45.0 |
| Intrinsic viscosity (in N,N-dimethyl formamide at 30° C.) | 1.04 |
| Standard water vapor permeability (mg./cm.$^2$.hr.) | 6.5 |
| Stress at 10% elongation (kg./mm.$^2$) | 0.37 |
| Tenacity at break (kg./mm.$^2$) | 4.9 |
| Elongation at break (percent) | 488 |
| Water vapor permeability after embossing treatment (mg./cm.$^2$.hr.) | 3.9 |
| Stiffness during wearing | Grade 1 |

The surface-unfinished artificial leather used in this example was produced in the following manner described in the copending application No. 6,600.

A reaction vessel was charged with 1000 parts of 4,4-diphenylmethane diisocyanate maintained at 50° C., 1168 parts of polybutylene adipate of a molecular weight of 1460 maintained at 60° C., and 350 parts of polyoxyethylene glycol of a molecular weight of 1750 maintained at 60° C. Reaction was effected at 95° C. for 2 hours in a nitrogen gas stream while stirring. All of the reaction product was added to a solution consisting of 224 parts of propylene glycol, 4113 parts of tetrahydrofuran, and 0.3 part of dibutyltin dilaurate, and they were reacted at 60° C. According to advance of the reaction tetrahydrofuran was gradually added to the reaction mixture so as to give a reaction product of a solid content of 30% at the end of the reaction. The viscosity of the product was 260 poise at 60° C. at completion of the reaction and it took a semitransparent appearance. To 1000 parts of the so obtained solution were added 490 parts of tetrahydrofuran and 510 parts of methyl isobutyl ketone to form a solution of a solid content of 15%.

Five hundred parts of water were added to 1000 parts of the above solution while stirring by means of a high speed mixer. Thus, there was obtained a very stable dispersion having a white, creamy appearance.

The dispersion obtained was coated on the dispersion-impregnated substrate of a non-woven fabric having a weight of 410 g./m.$^2$ and a thickness of 1.02 mm. prepared by subjecting polyethylene terephthalate staple fibers having a finess of 1.5 denier and a cut length of 50 mm. to webbing, needling and shrinking treatments. The coated thickness in wet condition was 2.2 mm. Selective evaporation of tetrahydrofuran was carried out at 25° C. for 30 minutes and then an 50° C. and 80% RH for 30 minutes to gel the coating layer. The remaining solvent and water were removed from the gelled coating layer by drying at 100° C. The resulting sheet consisting of an upper microporous layer and a lower non-woven fabric layer reinforced by the microporous resin had a rate of water vapor permeability of 6.4 mg./cm.$^2$/hr.

EXAMPLE 6

A reactor was charged with 100 parts of polyoxyethylene-propylene ether glycol having a hydroxyl value of 94 obtained by copolymerization of ethylene oxide and propylene oxide at a ratio of 70:30, followed by reacting for 70 minutes at 90° C. on addition of 131 parts of 4,4'-diphenyl methane diisocyanate, to produce an isocyanate-terminated prepolymer. The prepolymer was dissolved in a mixed solvent consisting of 138 parts of N,N-dimethyl formamide, 137 parts of dioxane, and 137 parts of tetrahydrofuran, and on addition of 0.28 part of triethylene diamine and 44 parts of diethylene glycol, reacted for 180 minutes at 40° C. The reacted solution was diluted with a mixed solvent consisting of 114.5 parts each of dioxane and methyl ethyl ketone, and reacted for 50 minutes. A polymer solution having a concentration of 30% and a viscosity at 40° C. of 41,000 centipoises was obtained. A mixed solution consisting of 1.1 parts of methanol, 229 parts of dioxane and 229 parts of methyl ethyl ketone was added to the polymer solution so obtained, and the end terminating reaction was performed for 40 minutes, to prepare a surface finishing polymer.

Two parts of a delusterant, 15 parts of carbon black and a stabilizer and the like were added to 100 parts of the polymer obtained, thereby forming a surface finishing agent. The resulting surface finishing agent was coated on a surface-unfinished artificial leather having a thickness of 1.48 mm., an apparent density of 0.5 g./cm.$^3$, and a water vapor permeability of 5.2 mg./cm.$^2$ hr. in a thickness of 16$\mu$. The properties of the surface-finishing polymer and those of the surface-finished articificial leather are shown in Table 8.

TABLE 8

| | |
|---|---|
| Polyoxyethylene content of the polymer (percent by weight) | 23.8 |
| Intrinsic viscosity (in N,N-dimethyl formamide at at 30° C.) | 0.89 |
| Standard water vapor permeability (mg./cm.$^2$ hr.) | 3.8 |
| Stress at 10% elongation (kg./mm.$^2$) | 0.34 |
| Tenacity at break (kg./mm.$^2$) | 4.2 |
| Elongation at break (percent) | 565 |
| Water vapor permeability after embossing treatment (mg./cm.$^2$ hr.) | 3.2 |
| Stuffiness during wearing | Grade 2 |

The surface-unfinished artical leather used in this example was prepared in the following manner disclosed in the copending application No. 6,600.

A reaction vessel was charged with 750 parts of 4,4'-diphenylmethane diisocyanate maintained at 50° C., 1300 parts of polyethylene adipate of a molecular weight of 1625 maintained at 60° C., and 300 parts of polyoxyethylene glycol of a molecular weight of 1,500 maintained at 60° C. Reaction was effected in a nitrogen gas stream at 100° C. for 2 hours while stirring to give a viscous prepolymer of a free NCO content of 7.10%. All of the resulting prepolymer was added to a mixture composed of 170 parts of butylene glycol, 3780 parts of methyl ethyl ketone and 3.0 parts of triethylene diamine, and the resulting mixture was reacted at 70° C. for 10 hours. The viscosity at 70° C. of the reaction product was 870 poise at completion of the reaction. The product was diluted with methyl ethyl ketone to form a slurry-like suspension of a solid content of 20%.

The above suspension was further diluted with methyl ethyl ketone to a solid content of 17.5%. To 1000 parts of the resulting liquor maintained at 30° C. were added 500 parts of water over a period of time of 5 minutes while agitating the system by means of a high speed stirring mixer. After completion of addition of water, the agitation was continued for further 5 minutes. Thus, there was obtained a white, creamy dispersion of a viscosity of 4200 cps. at 30° C.

Bubbles incorporated during the agitation were removed from the above dispersion under reduced pressure, and then the dispersion was applied to a bi-axially stretched polyethylene terephthalate film in a thickness in a wet condition of 1.8 mm. The selective evaporation of the methyl ethyl ketone was effected at 25° C. for 40 minutes, followed by drying at 100° C. for 20 minutes.

EXAMPLE 7

A reactor was charged with 165 parts of polyoxyethylene glycol having a molecular weight of 3000, 11.8 parts of diethylene glycol and 45.5 parts of p-xylylene glycol, which were then dissolved by addition of 445 parts of N,N-dimethyl formamide and 28 parts of dioxane. On addition of 133 parts of 4,4'-methylene-bis(cyclohexyl izocyanate), the solution was reatced for 5 minutes, and on addition of 0.23 part of triethylene diamine, the reaction was continued at 40° C. for 280 minutes. Two parts of methanol and a mixed solvent consisting of 482 parts of tetrahydrofuran and 464 parts of dioxane were added over a period of 60 minutes. The stirring was continued for 20 minutes, and the polymerization was terminated. 180 parts of the polymer solution so obtained were diluted with a mixed solvent consisting of 100 parts of tetrahydrofuran, 167 parts of dioxane, 30 parts of cyclohexanone and 15 parts of toluene. While stirring the solution at high speed, 3.53 parts of "Microlith White RK" (product of Ciba Limited, Switzerland) and 0.07 part of "Microlith Red A3BK" were added to make a uniform dispersion, followed by adding 1.08 parts of "Yoshinox BB" (Yoshoshitomi Pharmaceutical Co., Ltd., Japan) as stabilizer, thereby forming a surface finishing agent.

The surface finishing agent obtained was coated by a gravure printing machine on a surface-unfinished artificial leather obtained by the same method as set forth in Example 6 and having a thickness of 1.10 mm., an apparent density of 0.52 g./cm.$^3$, and a water vapor permeability of 5.4 mg./cm.$^2$ hr. in a thickness of $10\mu$ and at a weight of 12 g./m.$^2$. The finished artificial leather was embossed. The properties of the surface finishing polymer and those of the surface-finished artificial leather are shown in Table 9.

TABLE 9

| | |
|---|---|
| Polyoxethylene content of the polymer (percent by weight) | 46.5 |
| Intrinsic viscosity (at 30° C. in dimethyl formamide) | 0.96 |
| Standard water vapor permeability (mg.cm.$^2$ hr.) | 6.7 |
| Stress at 10% elongation (kg./cm.$^2$) | 0.87 |
| Water vapor permeability after embossing (mg./cm.$^2$ hr.) | 4.2 |

Using the surface-finished artificial leather, ladies' shoes were produced. Wearer sof such shoes felt no "stuffiness." The inside of the shoes during wearing gave no dampy feeling, and no deposition of water drops was observed. The stuffiness during wearing was Grade 1.

We claim:

1. An artificial letaher consisting of a fibrous substrate, a microporous polyurethane layer formed on said fibrous substrate by impregnation or coating, and a polyurethrane surface finish layer coated on said microporous layer, wherein:

(A) the surface-unfinished article consisting of said fibrous substrate and microporous polyurethane layer has a thickness of 0.3–2.5 mm., an apparent density of 3.0–0.9 g./cm.$^3$ and a rate of water vapor permeability of at least 3 mg./cm.$^2$.hr. under 19 mm. Hg water vapor pressure difference;

(B) said polyurethane surface finish layer has a thickness of 5–30$\mu$; and (C) the polyurethane of said surface finish layer is prepared from a solvent solution or suspension of polyurethane characterized as follows:

(a) said polyurethane is derived from a polyol having a polyoxyethylene segment and molecular weight of 600 to 4,000, a diisocyanate selected from the group consisting of 4,4'-diphenylmethane diisocyanate, xylylene diisocyanate, 1,4-phenylene diisocyanate, 2,4-tolylene diisocyanate, 2,6-tolylene diisocyanate, 1,5-naphthylene diisocyanate, cyclohexylene diisocyanate, 4,4' - dicyclohexylene diisocyanate, 4,4' - methylene-bis(cyclohexyl isocyanate), tetramethylene diisocyanate and hexamethylene diisocyanate, and a chain extender having a molecular weight of not more than 500, (b) said polyurethane contains 15–75% by weight of a polyoxyethylene segment, (c) a film prepared from said polyurethane has a stress at 10% elongation, at 20° C. and 65% relative humidity, of 0.1–2.0 kg./mm.$^2$, and (d) a 15$\mu$ thick nonporous film prepared from said polyurethane has a rate of water vapor permeability of at least 3 mg./cm.$^2$.hr. under 19 mm. Hg water vapor difference.

2. The artificial leather of claim 1 wherein the polyurethane of said surface finishing layer has an intrinsic viscosity, measured in N,N-dimethyl formamide at 30° C., of at least 0.80.

3. The artificial leather of claim 1 wherein said surface-unfinished article has a rate of water vapor permeability of 4.5–8 mg./cm.$^2$.hr. under 19 mm. Hg water vapor pressure difference, said polyol having a polyoxyethylene segment has a molecular weight of 1,000 to 3,000, said polyurethane of the surface finish layer contains 30–65% by weight of a polyoxyethylene segment, and a 15$\mu$ thick nonporous film prepared from said polyurethane has a rate of water vapor permeability of at least 3.5 mg./cm.$^2$. hr. under 19 mm. Hg water vapor pressure difference.

4. The artificial leather of claim 1 wherein said polyol is selected from the group consisting of polyoxyethylene glycol, polyoxyethylenepropylene glycol having at least 60% by weight of a polyoxyethylene segment, polyoxyethylene butylene glycol, and mixtures thereof.

5. The artificial leather of claim 1 wherein said polyol is a mixture of 30% by weight or less of at least one polyol selected from the group consisting of polyoxypropylene glycol and polyoxybutylene glycol and at least 70% by weight of at least one polyol selected from the group consisting of polyoxyethylene glycol, polyoxyethylenepropylene glycol containing at least 60% by weight of polyoxyethylene segments, and polyoxyethylenebutylene glycol containing at least 60% by weight of polyoxyethylene segments.

6. The artificial leather of claim 1 wherein said polyol is a mixture of 30% by weight or less of at least one polyester selected from the group consisting of polyethylene adipate, polyethylenepropylene adipate, polybutylene, adipate, polypropylene succinate, polybutylene sebacate and poly-ε-caprolactone and at least 70% by weight of at least one polyol selected from the group consisting of polyoxyethylene glycol, polyoxyethylenepropylene glycol containing at least 60% by weight of polyoxyethylene segments and polyoxyethylenebutylene glycol containing at least 60% by weight of polyoxyethylene segments.

7. The artificial leather of claim 1 wherein said chain extender is selected from the group consisting of tetramethylene glycol, ethylene glycol, propylene glycol, p-xylylene glycol, N-methyl diethanolamine, and diethylene glycol.

8. The artificial leather of claim 1 wherein said chain extender is selected from the group consisting of N-methyl ethanolamine, monoethanolamine, water, ethylene diamine, hexamethylene diamine, p-phenylene diamine, piperazine, and hydrazine.

References Cited

UNITED STATES PATENTS

| | | | |
|---|---|---|---|
| 3,493,634 | 2/1970 | Kolychek | 117—161 X |
| 3,505,252 | 4/1970 | Broherton et al. | 117—161 X |
| 3,484,273 | 12/1969 | Kawase et al. | 260—2.5 X |
| 3,549,475 | 12/1970 | Hefley et al. | 117—135.5 |
| 3,387,989 | 6/1968 | West et al. | 117—161 X |
| 3,515,573 | 6/1970 | Japs et al. | 117—161 X |
| 2,575,577 | 11/1951 | Beauchamp | 117—161 X |
| 2,976,182 | 3/1961 | Caldwell et al. | 117—135.5 |
| 3,100,721 | 8/1963 | Holden | 117—135.5 |
| 3,245,827 | 4/1966 | Weber | 260—2.5 X |
| 3,311,527 | 3/1967 | Urbanic et al. | 161—190 X |
| 3,108,315 | 10/1968 | Paine | 260—2.5 X |
| 3,442,842 | 5/1969 | Von Bonin | 260—2.5 X |
| 3,486,946 | 12/1969 | Duddy | 260—2.5 X |

WILLIAM D. MARTIN, Primary Examiner

M. R. P. PERRONE, JR., Assistant Examiner

U.S. Cl. X.R.

117—76 P, 135.5, 161 KP; 161—190; 260—2.5 AY